3 Sheets—Sheet 1.

W. H. JOHNSON.

Sewing Machine.

No. 355.

Reissued Feb. 26, 1856.

W. H. JOHNSON.

Sewing Machine.

3 Sheets—Sheet 2.

No. 355.

Reissued Feb. 26, 1856.

3 Sheets—Sheet 3.

W. H. JOHNSON.

Sewing Machine.

No. 355.

Reissued Feb. 26, 1856.

UNITED STATES PATENT OFFICE.

WM. H. JOHNSON, OF GRANVILLE, MASSACHUSETTS.

IMPROVEMENT IN SEWING-MACHINES.

Specification forming part of Letters Patent No. 10,597, dated March 7, 1854; Reissue No. 355, dated February 6, 1856.

*To all whom it may concern:*

Be it known that I, WILLIAM H. JOHNSON, of Granville, in the county of Hampden and State of Massachusetts, have invented a new and useful Improvement in Sewing-Machines; and I do hereby declare that the following is a full, clear, and exact description of the same, reference being had to the annexed drawings, forming part of this specification, in which—

Figure 1:
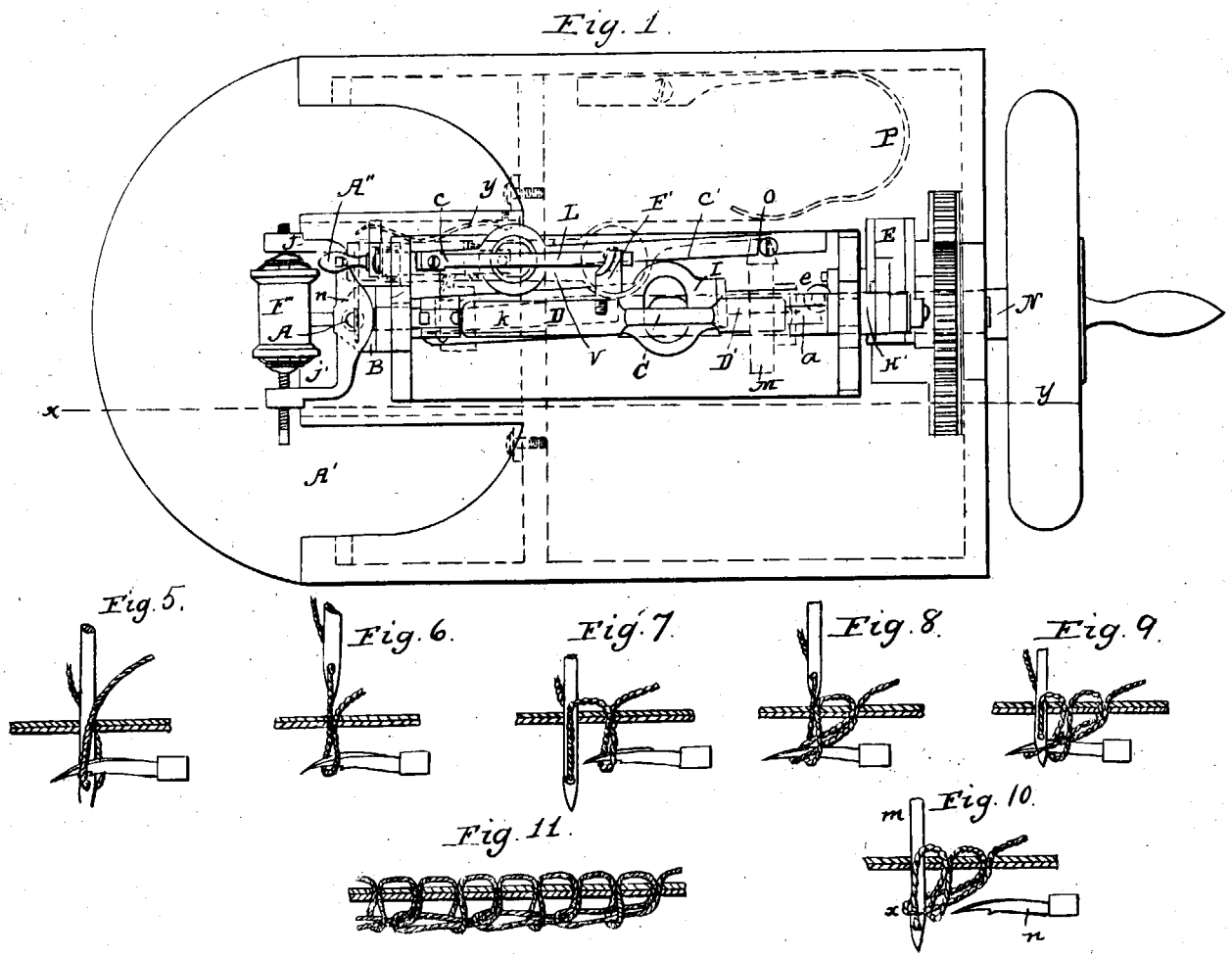
Figure 2:
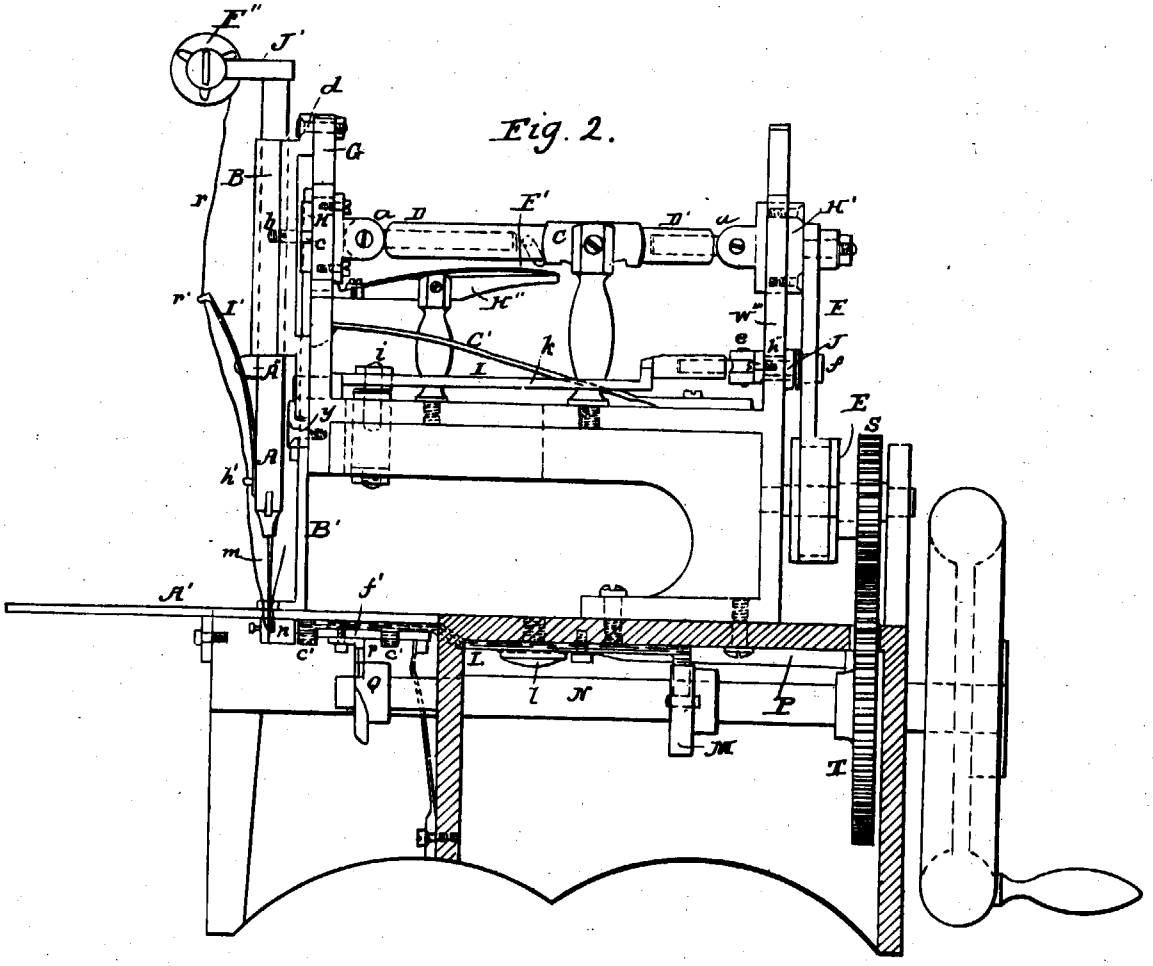
Figure 4:
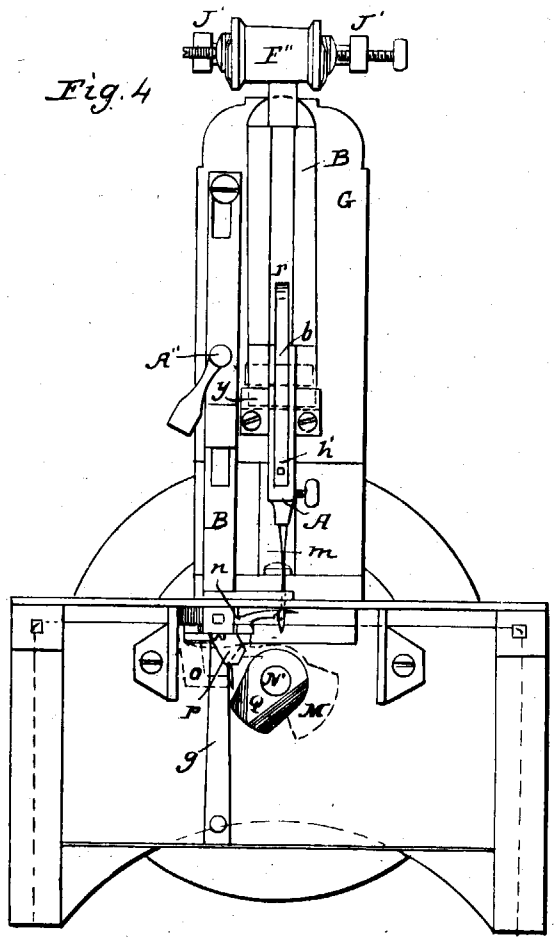
Figure 3:
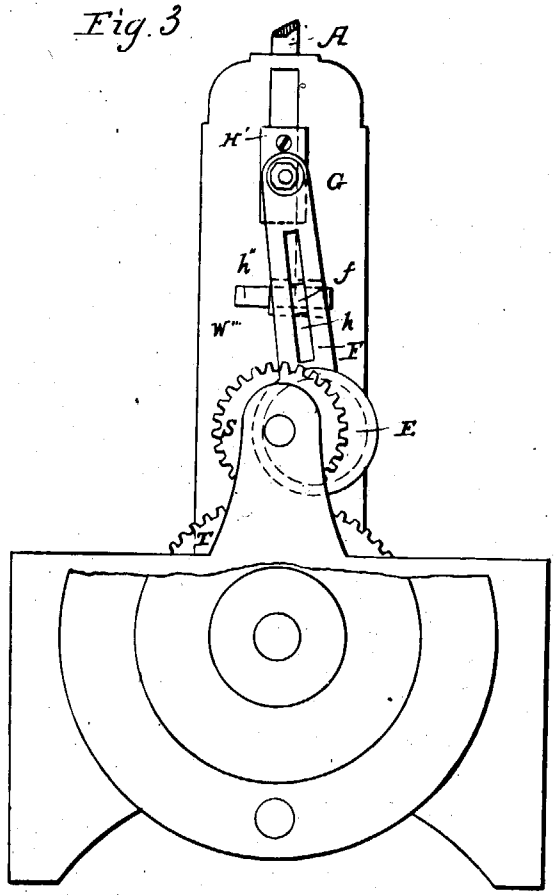

Figure 1 is a plan of the machine. Fig. 2 is a side elevation and section of the bed on line *x y* of Fig. 1. Fig. 3 is a rear elevation of the machine. Fig. 4 is a front elevation of the machine. Fig. 5 shows the first step in the formation of the stitch. Fig. 6 shows the first loop left upon the hook when the needle has withdrawn. Fig. 7 shows the needle after the second perforation. Fig. 8 shows the position of the hook after shooting into the second loop. Fig. 9 shows the position of the parts after the third perforation of the needle. Fig. 10 shows the position of the loops after the hook has left the thread. Fig. 11 shows the formation of the stitch on a large scale.

The first part of my invention consists in making a seam of one thread by means of a single needle and a double spring-hook, which I call the "belaying double-loop stitch," in which the stitches are so looped and interlocked with each other that they cannot easily be picked out or unraveled by pulling upon any part of the thread.

The second part of my invention consists in applying the power by which the material is fed directly to the goods themselves, and at or near the point where the stitches are being formed.

In the machines heretofore constructed the material has been fed by means of power applied to the clamp or bar to which the goods were attached—a method which very much limits the capabilities of the machine.

To enable others skilled in the art to understand my invention, I will proceed to describe the manner in which I have carried it out.

In the accompanying drawings, A represents the needle-bar, moving vertically in the guide B, by reason of the alternate elevation and depression of the arms of the beam C, caused by the connection of the arm D′ with the eccentric E, through the connecting-rod F, the beam being connected with the slides H H′ by the socket-joints *a*, and the needle-bar A, attached to the slide H, by the screw *b*, fastened to the bar, and having its head *c* working loosely in the slide H. The guide B is attached to the upright G at *d*, about which point it has a vibratory side motion, because of its connection with the slotted lever I, the long arm of which is connected by the joint *e* with the horizontal slide J, which has an alternate lateral motion, because of the arm *f* of the slide J moving in the slots *h* of the connecting-rod F, and *h″* of the standard W, the amplitude of the oscillation of the guide B being governed by the position of the fulcrum *i*, which is movable in the slot K. The lower extremity of the guide B passes within the guide *y*, for the purpose of steadying its movement. Connected with the upright G is the vertical bar B′, which is capable of motion in the direction of the upright, and is held down upon the table A′ by the action of the spring C′, and is raised by the pressure of the stud F′ of the beam C upon the extremity of the lever H″, so that the pressure upon the table is relieved each time the needle-bar A is forced down by the beam C. This forms the holding arrangement, which keeps the material in position while the needle is making the preparation, and rises to permit the feed during the side vibration of the needle.

On the under side of the table A′ is the lever L, carrying in its long arm the spring-hook *n*, upon which the loops are formed. This lever is movable about the fulcrum *l* by means of the cam M on the shaft N, against which the projecting stud O presses, being held in position by the spring P. The long arm of the lever L is formed of two parts, one moving longitudinally upon the other in the guide *c′* by reason of the cam Q on the shaft N, which acts against the stud *p* to throw forward the movable portion *f′*, the spring *q* withdrawing it and preserving it in position during the time it is free from the action of the cam Q. The operation of this expanding lever will be shown fully hereinafter.

The operation of the machine is as follows: The thread passes from the spool F″ through the eye *r′* of the spring-guide I′ and eye *h′* on the needle-bar A to the eye of the needle *m*, through which it is passed from the outside. The spool F″ is suspended between the arms J′, attached to the upper extremity of the needle-bar A by an arrangement of plates, screws, and springs which regulate the unwinding of the thread, while the position of the spool prevents the distance between it and the eye of the needle from changing during the operation of sewing, thus preventing jerks and diminishing the risk of the breaking of the thread. After adjusting the thread apparatus, the material to be sewed is placed upon the table A′, under the point of the needle *m* and cloth-holder B′, which is raised by the stud A″ to admit the thickness. Power applied in any convenient manner revolves the shaft N, which, through the cog-wheels S and T, gives motion to the eccentric E, operating the needle-bar A, so as to give it a compound vertical and vibratory motion by means of the beam C, slides H and H′, and slotted lever I, arranged and working as above described. The descent of the needle perforates the cloth, and by the action of the stud F′ upon the lever H″ the pressure of the holder upon it is relieved, permitting the vibration of the needle, as above described, to move forward the cloth a sufficient distance for the succeeding perforation, the spring C′ acting through the holder B′ as the needle-bar rises, so as to keep the cloth from slipping when the needle descends and again perforates it. The stitch, which, as before stated, is formed of a single thread by means of a single needle, *m*, in the extremity of the needle-bar A and a hook inserted in an expanding lever, will be readily understood by reference to the annexed drawings, which show it in the several steps of forwardness, the various positions which the needle, hook, and thread assume being represented by separate figures drawn to a large scale. As above described, the needle *m* passes through the cloth, carrying with it the thread *r*. As it begins to withdraw, a loop is formed on it, into which shoots the forked hook *n* by the action of the cam M, as shown in Fig. 5. The upward action of the needle-bar continuing, the needle *m* rises from the cloth, leaving the loop upon the hook *n*, as seen in Fig. 6. The vibration of the needle during the first perforation feeds forward the cloth, and permits the needle, in its second descent, to have the position shown in Fig. 7, forming a loop as the needle rises, through which shoots the hook *n*, carrying the first loop with it and assuming the position shown in Fig. 8, the loops being crossed and kept from slipping by the notches on the under side of the hook. During the second descent of the needle the cloth is fed forward as before, and as it again descends, making a new hole, the cam Q commences its action, pressing against the stud *p* and expanding the lever L, so that the needle in its third descent passes between the forks of the hook *n*, and also between the two loops upon it, as seen in Fig. 9. The hook then slips from the thread, leaving the stitch, as shown in Fig. 10, formed of three loops, the first passed through the second and over the third. As the needle rises, the hook *n* shoots into the loop formed on the needle below the loop *x* in Fig. 10, which is left upon it as the first loop in Fig. 6, when the same operation above described is gone through with, making the third loop pass through the fourth and around the fifth, and forming the seam, as shown fully in Fig. 11, each alternate loop holding the preceding one to the cloth and making what I denominate the "belaying double-loop stitch," as seen in Fig. 11.

It is thus seen that the feeding action of this machine is performed by the operation of sewing, the vibrating movement of the guide B, and with it the bar A, causing the material to be moved forward after it is perforated, the holder relaxing for that purpose, the distance which it is moved being regulated by the position of the fulcrum of the slotted lever I. This feeding and perforating arrangement I design to use for making the holes in leather and other heavy work, while the needle preceding the awl forms the seam.

On the advantages of this machine it will be needless to enlarge, as its merits will be obvious to any one in any degree conversant with machines of this character. The formation of a strong seam by a single thread forms a decided improvement in sewing-machines, while the simple and effectual manner in which the feed is regulated surpasses any other method of performing that part of the operation and renders the machine applicable to the sewing of leather and other heavy material.

What I claim as my invention, and desire to secure by Letters Patent, is—

1. The making of a seam with a single thread by the combination of a single needle, forked hook, and expanding lever, operating substantially in the manner and for the purposes herein specified.

2. The forming or making of a seam from a single thread by the running of a loop of the thread through the material to be sewed, the running of a second loop through the material and putting the first loop through the second, the running of a third loop through the material and through the first-named loop, the carrying of a fourth loop through the material and putting the thread through it, and so on, putting the first loop through the second and around the third, the third loop through the fourth and around the fifth, and so on, forming the belaying double-loop stitch herein described, in the manner set forth.

3. The feeding of the material to be sewed by means of a vibrating piercing instrument, whether said instrument be the needle itself or an independent instrument in the immediate vicinity thereof, substantially as herein described.

In testimony whereof I have hereto annexed my signature this 26th day of September, 1855.

WILLIAM H. JOHNSON.

Witnesses:
JOHN S. CLOW,
P. E. TESCHEMACHER.